(12) United States Patent
Wyse et al.

(10) Patent No.: US 7,670,490 B2
(45) Date of Patent: *Mar. 2, 2010

(54) FLUID STORAGE AND PURIFICATION METHOD AND SYSTEM

(75) Inventors: Carrie L. Wyse, Longmont, CO (US);
Robert Torres, Jr., Parker, CO (US);
Tadaharu Watanabe, Saitama (JP);
Joseph V. Vininski, Boulder, CO (US)

(73) Assignee: Matheson Tri-Gas, Inc., Basking Ridge, NJ (US)

( * ) Notice: Subject to any disclaimer, the term of this patent is extended or adjusted under 35 U.S.C. 154(b) by 728 days.

This patent is subject to a terminal disclaimer.

(21) Appl. No.: 11/155,303

(22) Filed: Jun. 17, 2005

(65) Prior Publication Data

US 2006/0226074 A1 Oct. 12, 2006

Related U.S. Application Data

(63) Continuation of application No. 11/101,191, filed on Apr. 7, 2005, now Pat. No. 7,638,058.

(51) Int. Cl.
*B01D 11/00* (2006.01)

(52) U.S. Cl. ............ 210/634; 95/149; 95/151; 95/155; 95/241; 137/1; 222/1; 141/1; 141/70; 588/249

(58) Field of Classification Search ......... 210/263, 210/634, 638, 660, 663, 669; 137/1; 222/1, 222/129, 190, 195, 424.5; 95/51, 149, 151, 95/155, 156, 158, 187, 204, 241, 254, 166–169, 95/172–177; 96/155, 243, 263; 361/118; 502/111; 510/175; 585/809, 843, 833, 800, 585/862; 423/649; 141/1, 70; 588/249
See application file for complete search history.

(56) References Cited

U.S. PATENT DOCUMENTS 2,201,550 A 5/1940 Van Dijck et al.
(Continued)

FOREIGN PATENT DOCUMENTS

WO WO 02/34863 A1 5/2002

OTHER PUBLICATIONS

"Spectral Shifts in Acid-Base Chemistry. 1. Van der Waals Contributions to Acceptor Numbers". Floyd L. Riddle, Jr. and Frederick M. Fowkes, Journal of the American Chemical Society, vol. 112, No. 9, Apr. 25, 1990, downloaded from the internet Sep. 15, 2009.*

(Continued)

*Primary Examiner*—Joseph W Drodge
(74) *Attorney, Agent, or Firm*—Townsend and Townsend and Crew LLP

(57) ABSTRACT

A method of storing and dispensing a fluid includes providing a vessel configured for selective dispensing of the fluid therefrom. The vessel contains an ionic liquid therein. The fluid is contacted with the ionic liquid for take-up of the fluid by the ionic liquid. There is substantially no chemical change in the ionic liquid and the fluid. The fluid is released from the ionic liquid and dispensed from the vessel.

17 Claims, 4 Drawing Sheets

U.S. PATENT DOCUMENTS

| | | | |
|---|---|---|---|
| 2,386,523 | A | 10/1945 | Welling |
| 2,522,059 | A | 9/1950 | Gardener et al. |
| 2,851,395 | A | 9/1958 | Kiersted, Jr. et al. |
| 2,941,940 | A | 6/1960 | Chyn |
| 2,943,917 | A * | 7/1960 | Weitzel et al. ............. 423/649 |
| 3,549,332 | A | 12/1970 | Yoon |
| 4,359,596 | A | 11/1982 | Howard et al. |
| 4,603,148 | A | 7/1986 | Tom |
| 4,604,270 | A | 8/1986 | Tom |
| 4,659,552 | A | 4/1987 | Tom |
| 4,696,953 | A | 9/1987 | Tom |
| 4,716,181 | A | 12/1987 | Tom |
| 4,761,164 | A | 8/1988 | Pez et al. |
| 4,867,960 | A | 9/1989 | Tom |
| 5,164,093 | A | 11/1992 | Chilton et al. |
| 5,518,528 | A | 5/1996 | Tom et al. |
| 5,827,602 | A | 10/1998 | Koch et al. |
| 5,985,008 | A | 11/1999 | Tom et al. |
| 6,048,388 | A | 4/2000 | Schwarz |
| 6,103,101 | A | 8/2000 | Fragelli et al. |
| 6,110,258 | A | 8/2000 | Fraenkel et al. |
| 6,120,692 | A | 9/2000 | Wang et al. |
| 6,187,985 | B1 * | 2/2001 | Le Peltier et al. ........... 585/661 |
| 6,274,026 | B1 | 8/2001 | Schucker et al. |
| 6,339,182 | B1 | 1/2002 | Munson et al. |
| 6,379,634 | B1 | 4/2002 | Fields et al. |
| 6,388,893 | B1 | 5/2002 | Calderon |
| 6,395,070 | B1 | 5/2002 | Bhadha et al. |
| 6,425,946 | B1 | 7/2002 | Funke et al. |
| 6,461,411 | B1 | 10/2002 | Watanabe et al. |
| 6,501,000 | B1 | 12/2002 | Stibrany et al. |
| 6,531,270 | B1 | 3/2003 | Olson et al. |
| 6,531,515 | B2 | 3/2003 | Moore, Jr. et al. |
| 6,547,861 | B2 | 4/2003 | Funke et al. |
| 6,573,405 | B1 | 6/2003 | Abbott et al. |
| 6,579,343 | B2 | 6/2003 | Brennecke et al. |
| 6,624,127 | B1 | 9/2003 | Brask et al. |
| 6,703,507 | B2 | 3/2004 | Bahrmann et al. |
| 6,733,734 | B2 | 5/2004 | Watanabe et al. |
| 6,998,152 | B2 | 2/2006 | Uhlenbrock |
| 7,019,188 | B2 * | 3/2006 | Smith et al. ................. 585/809 |
| 7,022,655 | B2 | 4/2006 | Brask et al. |
| 7,172,646 | B2 | 2/2007 | Tempel et al. |
| 7,304,200 | B2 | 12/2007 | Roettger et al. |
| 7,396,381 | B2 * | 7/2008 | Graham et al. ................. 95/46 |
| 7,404,845 | B2 * | 7/2008 | Tempel et al. ................. 95/46 |
| 7,585,415 | B2 * | 9/2009 | Wyse et al. ................. 210/639 |
| 2001/0045187 | A1 | 11/2001 | Uhlenbrock |
| 2002/0169071 | A1 | 11/2002 | Sauvage et al. |
| 2003/0085156 | A1 | 5/2003 | Schoonover |
| 2003/0125599 | A1 | 7/2003 | Boudreau et al. |
| 2003/0149264 | A1 | 8/2003 | Wasserscheid et al. |
| 2003/0192430 | A1 | 10/2003 | Pearlstein et al. |
| 2004/0035293 | A1 | 2/2004 | Davis |
| 2004/0059008 | A1 | 3/2004 | Raje et al. |
| 2004/0106838 | A1 | 6/2004 | Smith et al. |
| 2004/0206241 | A1 | 10/2004 | Tempel et al. |
| 2005/0106086 | A1 | 5/2005 | Tomlinson et al. |
| 2005/0154247 | A1 * | 7/2005 | Jong et al. ................. 585/862 |
| 2005/0276733 | A1 | 12/2005 | Tempel et al. |
| 2006/0008392 | A1 * | 1/2006 | Graham et al. ............. 422/168 |
| 2006/0060817 | A1 | 3/2006 | Tempel et al. |
| 2006/0060818 | A1 | 3/2006 | Tempel et al. |
| 2006/0086247 | A1 * | 4/2006 | Vininski et al. ............. 95/115 |
| 2006/0226074 | A1 | 10/2006 | Wyse et al. |
| 2008/0028170 | A1 | 3/2008 | Cleary et al. |

OTHER PUBLICATIONS

Lynnette A. Blanchard, et al., "Green Processing Using Ionic Liquids and $CO_2$", Nature, vol. 399, May 6, 1999, pp. 28-29.

Michael Freemantle, "Ionic liquids show promise for clean separation technology", C&EN Aug. 24, 1998, p. 12.

M. Medved et al., "Potential Use of Ionic Liquids in Membrane Technology Applications", Institut für Verfahrenstechnik, AWTH-Rachen 11-123, 8. aachener membrane colloquium Mar. 27-29, 2001 Cover page and pp. 11-123 thru 11-127.

Paul Scovazzo et al. "Supported Ionic Liquid Membranes and Facilitated Ionic Liquid Membranes"; 2002 American Chemical Society, Chapter 6 pp. 69-87.

Mitja Medved et al., 409 Ionic Liquids as Active Separation Layer in Supported Liquid Membranes., Chemie Ingenieur Technik (73) Jun. 1, 2001.

Bates, Eleanor D. et al., "CO2 Capture by a Task-Specific Ionic Liquid", Journal of the American Chemical Society (2002), 124(6): 926-927.

PCT International Search Report and Written Opinion mailed Aug. 4, 2009, Application No. PCT/US2009/046902, 9 pages.

* cited by examiner

FLUID STORAGE AND PURIFICATION METHOD AND SYSTEM

RELATED APPLICATIONS

This application is a continuation application of U.S. patent application Ser. No. 11/101,191, filed Apr. 7, 2005, now U.S. Pat. No. 7,638,058.

BACKGROUND

Many industrial processes require a reliable source of process gases for a wide variety of applications. Often these gases are stored in cylinders or vessels and then delivered to the process under controlled conditions from the cylinder. For example, the silicon semiconductor manufacturing industry, as well as the compound semiconductor industry, uses a number of hazardous specialty gases such as diborane, stibene, phosphine, arsine, boron trifluoride, hydrogen chloride, and tetrafluoromethane for doping, etching, thin-film deposition, and cleaning. These gases pose significant safety and environmental challenges due to their high toxicity and reactivity. Additionally, storage of hazardous gases under high pressure in metal cylinders is often unacceptable because of the possibility of developing a leak or catastrophic rupture of the cylinder, cylinder valve, or downstream component.

In order to mitigate some of these safety issues associated with high pressure cylinders, there is a need for a low pressure storage and delivery system. Additionally, some gases, such as diborane, tend to decompose when stored for a period of time. Thus, it would be useful to have a way to store unstable gases in a manner that reduces or eliminates the decomposition.

It is also desirable to have a method of removing impurities from gases, particularly in the semiconductor industry. The growth of high quality thin film electronic and optoelectronic cells by chemical vapor deposition or other vapor-based techniques is inhibited by a variety of low-level process impurities which are present in gas streams involved in semiconductor manufacturing or are contributed from various components such as piping, valves, mass flow controllers, filters, and similar components. These impurities can cause defects that reduce yields by increasing the number of rejects, which can be very expensive.

Chemical impurities may originate in the production of the source gas itself, as well as in its subsequent packaging, shipment, storage, handling, and gas distribution system. Although source gas manufacturers typically provide analyses of source gas materials delivered to the semiconductor manufacturing facility, the purity of the gases may change because of leakage into or outgassing of the containers, e.g. gas cylinders, in which the gases are packaged. Impurity contamination may also result from improper gas cylinder changes, leaks into downstream processing equipment, or outgassing of such downstream equipment. Source gases may include impurities, or impurities may occur as a result of decomposition of the stored gases. Furthermore, the impurity levels within the gas container may increase with length of storage time and can also change as the container is consumed by the end user. Thus, there remains a need to be able to remove contaminants from gases, particularly to very low levels.

BRIEF SUMMARY

In one aspect of the invention, a method of storing and dispensing a fluid is provided. The method includes providing a vessel configured for selective dispensing of the fluid therefrom. The vessel contains an ionic liquid therein. The fluid is contacted with the ionic liquid for take-up of the fluid by the ionic liquid. There is substantially no chemical change in the ionic liquid and the fluid. The fluid is released from the ionic liquid and dispensed from the vessel. The fluid may be selected from alcohols, aldehydes, amines, ammonia, aromatic hydrocarbons, arsenic pentafluoride, arsine, boron trichloride, boron trifluoride, carbon disulfide, carbon monoxide, carbon sulfide, diborane, dichlorosilane, digermane, dimethyl disulfide, dimethyl sulfide, disilane, ethers, ethylene oxide, fluorine, germane, germanium methoxide, germanium tetrafluoride, hafnium methylethylamide, hafnium t-butoxide, halogenated hydrocarbons, halogens, hexane, hydrogen, hydrogen cyanide, hydrogen halogenides, hydrogen selenide, hydrogen sulfide, ketones, mercaptans, nitric oxides, nitrogen, nitrogen trifluoride, organometallics, oxygenated-halogenated hydrocarbons, phosgene, phosphorus trifluoride, n-silane, pentakisdimethylamino tantalum, silicon tetrachloride, silicon tetrafluoride, stibine, styrene, sulfur dioxide, sulfur hexafluoride, sulfur tetrafluoride, tetramethyl cyclotetrasiloxane, titanium diethylamide, titanium dimethylamide, trichlorosilane, trimethyl silane, tungsten hexafluoride, and mixtures thereof. The ionic liquid may be selected from mono-substituted imidazolium salts, di-substituted imidazolium salts, tri-substituted imidazolium salts, pyridinium salts, phosphonium salts, ammonium salts, tetralkylammonium salts, guanidinium salts, isouronium salts, and mixtures thereof.

In another aspect of the invention, a method of separating an impurity from a fluid mixture is provided. The fluid mixture includes a fluid and the impurity. A device contains an ionic liquid and is configured for contacting the ionic liquid with the fluid mixture. The fluid mixture is introduced into the device. The fluid mixture is contacted with the ionic liquid. A portion of the impurity is retained within the ionic liquid to produce a purified fluid.

In another aspect of the invention, a method of storing and stabilizing an unstable fluid is provided. The method includes providing a vessel containing an ionic liquid therein. The unstable fluid is contacted with the ionic liquid for take-up of the unstable fluid by the ionic liquid. The unstable fluid is then stored within the ionic liquid for a period of time, during which period of time there is substantially no decomposition of the unstable fluid. The unstable fluid may be selected from digermane, disilane, hydrogen selenide, borane, diborane, stibene, nitric oxide, organometallics, and halogenated oxyhydrocarbons.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

DETAILED DESCRIPTION

Figure 1:
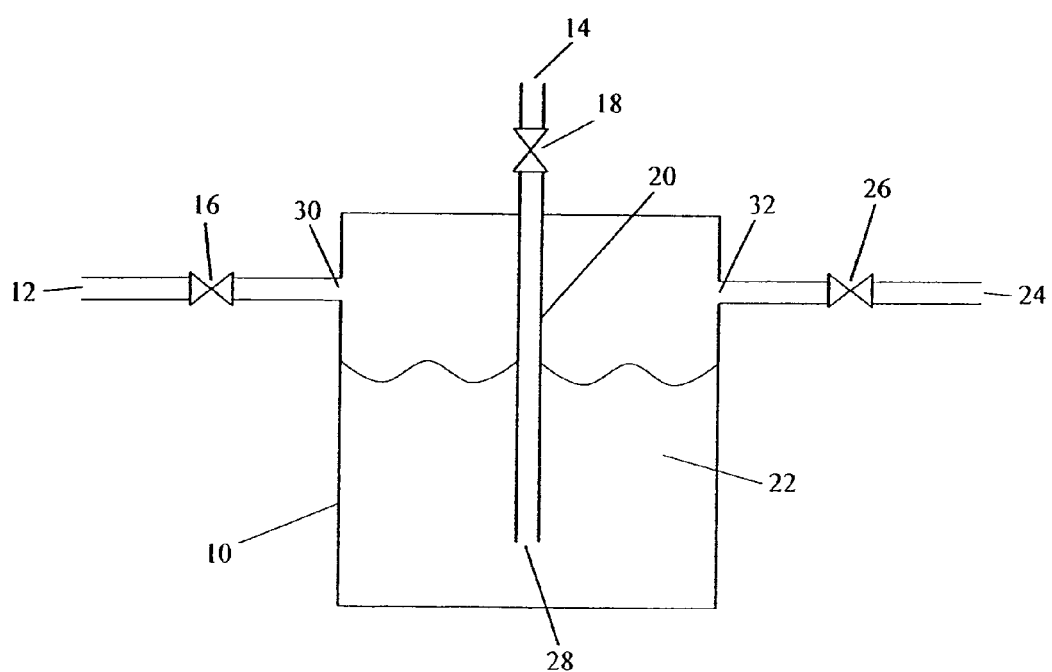
FIG. 1 shows an embodiment of a vessel for storing a fluid in an ionic liquid.

The invention is described with reference to the drawings. The relationship and functioning of the various elements of this invention are better understood by the following detailed description. However, the embodiments of this invention as described below are by way of example only, and the invention is not limited to the embodiments illustrated in the drawings.

The present invention is directed to the use of ionic liquids to store a fluid material such as a gas or liquid. A vessel is configured for the selective dispensing of the fluid and contains an ionic liquid. The fluid is contacted with the ionic liquid for take-up of the fluid by the ionic liquid. This allows storage of the fluid for a period of time. In one embodiment, the material in the storage vessel is at high pressure, for example up to about 4000 psi, preferably up to at least about 2000 psi. In another embodiment, the pressure of the material in the storage vessel is at around atmospheric pressure, which allows for safer storage conditions compared to high-pressure storage vessels.

The ionic liquids may also be used to store unstable fluids such as diborane which tend to decompose. The storage in the ionic liquid can reduce or eliminate the decomposition of the unstable fluids.

The present invention is also directed to the use of ionic liquids to remove impurities from a fluid mixture. A device contains an ionic liquid and is configured for contacting the ionic liquid with the fluid mixture. The fluid mixture is introduced into the device and the fluid mixture is contacted with the ionic liquid. A portion of the impurities are retained within the ionic liquid to produce a purified fluid. This purification method may be combined with the previously described storage method.

Ionic liquids are a relatively new class of materials which can offer such physical properties as extremely low vapor pressure, high thermal stability, and low viscosity. Generally, ionic liquids consist of a bulky, asymmetric cation and an inorganic anion. The bulky, asymmetric nature of the cation prevents tight packing, which decreases the melting point. Due to the wide variety of cations and anions possible for such ion pairs, a wide range of gas solubilities is conceivable, for a variety of inorganic and organic materials. The physical properties of ionic liquids can include good dissolution properties for most organic and inorganic compounds; high thermal stability; non-flammability; negligible vapor pressure; low viscosity, compared to other ionic materials; and recyclability.

The wide range of chemical functionalities available with ionic liquids offers possibilities for gas delivery and control. For example, ionic liquids may provide the capability to control the release of a gas and/or its impurities via solubility control with temperature or pressure. This may enable the storage of a gas and its impurities, while selectively releasing only the desired gas by changing certain parameters, such as temperature or pressure, leaving the impurities behind. Thus there is potential for an ionic liquid system that could function as a 2-in-1 system, providing both storage and purification in one container.

Ionic liquids can have a stabilizing effect on intermediate reaction species in organic synthesis and catalysis. Thus, ionic liquids can offer stabilizing effects for unstable gas molecules. Thus, utilization with even a small amount of ionic liquid, can reduce or eliminate the decomposition of the unstable fluids. Storage of a gas or other fluid in an ionic liquid may also be combined with the previously mentioned purification system to provide a 3-in-1 storage, stabilization, and purification system.

One potential issue in the use of ionic liquids for the storage of gases is the vapor pressure of the ionic liquids. The vapor pressure of the ionic liquid can contaminate the delivered gas with ionic liquid. The present understanding is that ionic liquids have very low or possibly no measurable vapor pressure of their own. This quality is an attractive feature of ionic liquids for use with storage and purification of gases. Vapor pressures have been reported for mixtures of ionic liquids with other dissolved liquids. The vapor pressure of the ionic liquids used in the present invention are preferably less than about $10^{-4}$ Torr at 25° C., more preferably less than about $10^{-6}$ Torr at 25° C.

The mechanism for the dissolution of a fluid within an ionic liquid is believed to be due to intermolecular forces. While not intending to be bound by any particular theory, possible factors that influence the solubility include hydrogen bonding, dielectric constant, dipole moment (polarizability), high pi interaction, length of carbon chain, number of carbon double bonds, the purity of the ionic liquid, chirality, and steric hindrance. It is not believed that the fluids chemically react with the ionic liquid; rather, it is believed that the fluids simply dissolve in the ionic liquid without the breaking of bonds. The breaking of bonds in either the ionic liquid or the fluids being stored therein would change the chemical and physical properties of the ionic liquid or fluids and could cause the new species to be considered a new impurity. It is the intention of this invention to store the fluid of interest in an ionic liquid wherein the fluid molecules remains intact and are removed from the ionic liquid with the same molecular structure as they were introduced into the ionic liquid.

The solubility of a gas in an ionic liquid varies with physical parameters such as temperature and pressure. However, it is also evident that the gas solubilities obtained depends on the ionic liquid used, particularly the anion and cation used. While not intending to be bound by any particular theory, the current understanding is that the anion has a strong influence on gas solubility. Specifically, the more interaction between the anion, the more dissolution appears to occur. The cation seems to be of secondary influence. Thus, several properties of the anion, the cation, and the dissolved gas play a role in these interactions. In addition, mixtures of different ionic liquids could result in unexpected high solubilities of various fluids.

The purity of an ionic liquid is also believed to have an impact on their behavior. Ionic liquids which have been dried or baked, thus leaving them substantially anhydrous, may exhibit greater increased capacity for taking up fluid components. In addition, the presence of water or other impurities may decrease the solubility of certain fluid components, especially those gas components that are hydrophobic.

The method of storing and dispensing a fluid includes providing a vessel. On embodiment of a vessel 10 is shown in FIG. 1. The vessel 10 includes a fluid inlet 20, an ionic liquid inlet 30, and a fluid outlet 32. The fluid inlet 20 is connected to a fluid source 14 which is controlled by a valve 18. The ionic liquid inlet 30 is connected to an ionic liquid source 12 which is controlled by a valve 16. The fluid outlet 32 is controlled by valve 26. The vessel is configured for selective dispensing of the fluid therefrom. The vessel is charged with an ionic liquid 22 through inlet 30. A vacuum bake procedure may be conducted on the vessel 10 to remove contaminants or other impurities from the ionic liquid, preferably by pulling a vacuum while heating. This is done in order to remove any trace moisture and/or other volatile impurities from the ionic liquid and the fluid distribution components. The ionic liquid is allowed to cool to the desired operating temperature.

The source fluid is then introduced into the vessel 10 until the take-up or dissolution of the fluid by the ionic liquid is complete. The fluid may be a gas or a liquid such as a liquefied gas. The fluid is contacted with the ionic liquid for take-up of the fluid by the ionic liquid. There is substantially no chemical change in the ionic liquid and the fluid. By "substantially no chemical change" is meant that no substantial amount of bonds in the fluid and the ionic liquid are being broken, such that the fluid and the ionic liquid retain their chemical identity. It is undesirable for the fluid to react with the ionic liquid to any significant effect. A reaction between the fluid and the ionic liquid would be expected to generate impurities or consume the fluid of interest.

The fluid may be introduced at any suitable pressure. In one embodiment, the fluid is a gas at a temperature of about 5 psi. In another embodiment, the gas is introduced at a pressure of at least about 100 psi, preferably up to about 2000 psi. The gas is introduced until the inlet and outlet concentrations are equivalent, indicating the ionic liquid is saturated and cannot accept any further gas under the existing conditions. At this time, the source gas flow is stopped.

In one embodiment, contacting the fluid with the ionic liquid comprises bubbling the fluid mixture through the ionic liquid, as shown in FIG. 1. The vessel 10 is charged with a fluid through inlet 28 and through dip tube 20, from whence it bubbles through ionic liquid 22.

Figure 2:
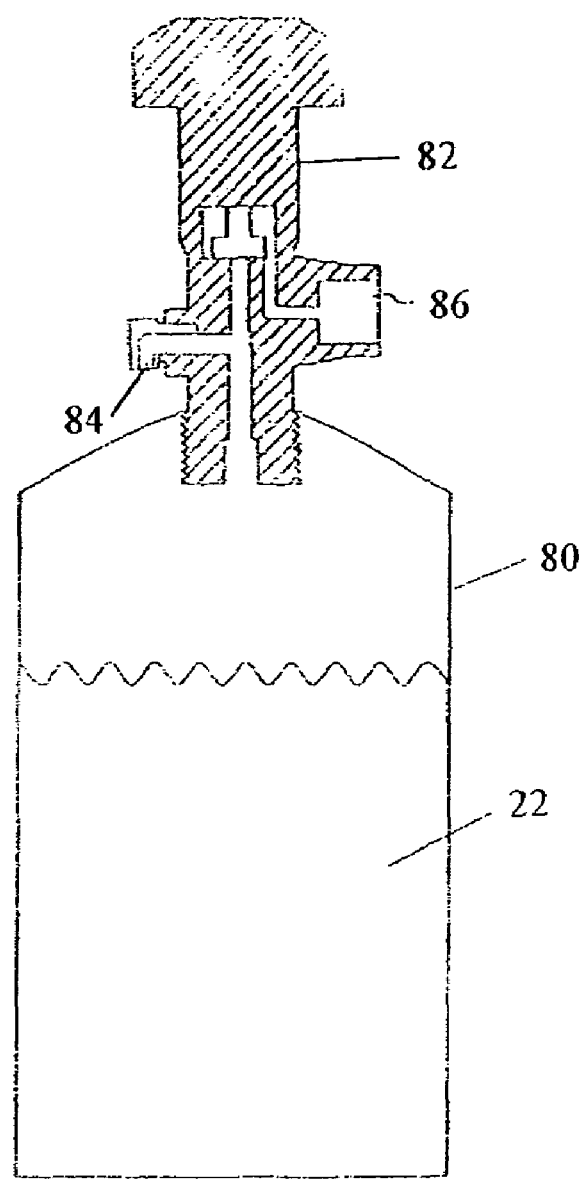
FIG. 2 shows another embodiment of a device for storing a fluid in an ionic liquid.

In another embodiment, the fluid is first introduced and then the vessel is mechanically agitated in order to contact the fluid with the ionic liquid. FIG. 2 shows an embodiment of a vessel 80 for storing a fluid in an ionic liquid. The ionic liquid 22 is put into the vessel before valve assembly 82 is inserted unto the vessel 80. The fluid is then added to the vessel 80 containing the ionic liquid in the conventional fashion through inlet port 84 in valve assembly 82. The vessel 80 would then be mechanically agitated to contact the fluid with the ionic liquid 22. The fluid may be removed through outlet port 86.

In one embodiment, the fluid is a liquid. The vessel 80 shown in FIG. 2 may also be used to store a liquid in the ionic liquid. The ionic liquid 22 is put into the vessel before valve assembly 82 is inserted into the vessel 80. The liquid is then added to the vessel 80 in the conventional fashion through inlet port 84 in valve assembly 82. The vessel 80 would then be mechanically agitated to contact the liquid with the ionic liquid 22. The liquid may be removed through outlet port 86.

In another embodiment, countercurrent flow of the ionic liquid and the fluid is used to contact the fluid with the ionic liquid. In another embodiment, the fluid is a liquid, and the liquid and the ionic liquid are mixed to contact the fluid with the ionic liquid.

The fluid stored within the ionic liquid may be removed from the ionic liquid by any suitable method. The fluid is released from the ionic liquid in a substantially unreacted state. Pressure-mediated and thermally-mediated methods and sparging, alone or in combination, are preferred. In pressure-mediated evolution, a pressure gradient is established to cause the gas to evolve from the ionic liquid. In one embodiment, the pressure gradient is in the range of about atmospheric pressure to about 4000 psig. In a more preferred embodiment, the pressure gradient is typically in the range from $10^{-7}$ to 600 Torr at 25° C. For example, the pressure gradient may be established between the ionic liquid in the vessel, and the exterior environment of the vessel, causing the fluid to flow from the vessel to the exterior environment. The pressure conditions may involve the imposition on the ionic liquid of vacuum or suction conditions which effect extraction of the gas from the vessel.

In thermally-mediated evolution, the ionic liquid is heated to cause the evolution of the gas from the ionic liquid so that the gas can be withdrawn or discharged from the vessel. Typically, the temperature of the ionic liquid for thermal-mediated evolution ranges from −50° C. to 200° C., more preferably from 30° C. to 150° C. In one embodiment, the vessel containing the fluid and the ionic liquid is transported warm (i.e., around room temperature), then cooled when it is stored or used at the end user's site. In this manner, the fluid vapor pressure can be reduced at the end user's site and therefore reduce the risk of release of the gas from the vessel. Once the vessel is secured in a suitable location, the vessel can be chilled and the temperature can be controlled in such a manner as to limit the amount of gas pressure that is present in the container and piping. As the contents of the cylinder or other gas storage device are consumed, the temperature of the cylinder can be elevated to liberate the gas from the ionic liquid and to maintain the necessary amount of gas levels in the cylinder and piping.

The vessel may also be sparged with a secondary gas, in order to deliver the stored primary gas. In sparging, a secondary gas is introduced into the vessel in order to force the primary gas out of the ionic liquid and out of the storage container. Sparging of a container can take place wherein the secondary gas is selected from a group of gases that has relatively low solubility in the ionic liquid. The secondary gas is introduced into the ionic liquid in a manner wherein the secondary gas bubbles through the ionic liquid and displaces the primary gas from the ionic liquid. The resultant gas mixture of primary gas and secondary gas then exit the gas storage container and are delivered to a downstream component in the gas distribution system. The sparging parameters should be selected such that the maximum amount of primary gas is removed from the ionic liquid. This includes selection of the appropriate geometry of the sparging vessel such that the secondary gas has an enhanced pathway for the interaction or contact between the secondary fluid and the ionic liquid. In practice, this could be use of a long and narrow storage container wherein the secondary fluid is introduced at the bottom of the container and the outlet of the container is near the top. Additionally, a device such as a diffuser can be used within the storage container that causes the bubbles of the secondary gas to be very small and numerous. In this manner, the surface area or contact area of the bubbles of the secondary gas is enhanced with the ionic liquid. Finally, the parameters of temperature and pressure within the sparging storage container can be adjusted such that the desired concentration of the secondary gas and primary gas are constant and fall within a desired range. In this example, the sparging vessel can be a separate container from the typical storage container such as a gas cylinder, or the typical storage container can be used as the sparging vessel depending on the requirements of the specific application.

When released from the ionic liquid, the gas flows out of the vessel, by suitable means such as a discharge port or opening 24 in FIG. 1. A flow control valve 26 may be joined in fluid communication with the interior volume of the vessel. A pipe, conduit, hose, channel or other suitable device or assembly by which the fluid can be flowed out of the vessel may be connected to the vessel.

The present invention also provides a fluid storage and dispensing system. The system includes a fluid storage and dispensing vessel configured to selectively dispense a fluid therefrom. A suitable vessel is, for example, a container that can hold up to 1000 liters. A typical vessel size is about 44 liters. The vessel should be able to contain fluids at a pressure of up to about 2000 psi, preferably up to about 4000 psi. However, the vessel may also operate at around atmospheric pressure. Preferably, the container is made of carbon steel, stainless steel, nickel or aluminum. In some cases the vessel may contain interior coatings in the form of inorganic coatings such as silicon and carbon, metallic coatings such as nickel, organic coatings such as paralyene or Teflon based materials. The vessel contains an ionic liquid which reversibly takes up the fluid when contacted therewith. The fluid is releasable from the ionic liquid under dispensing conditions.

A variety of ionic liquids can be used in the present invention. Additionally, two or more ionic liquids may be combined for use in any of the aspects of the present invention. In one embodiment, the ionic liquid is selected from mono-substituted imidazolium salts, di-substituted imidazoliuxn salts, tri-substituted imidazolium salts, pyridinium salts, pyrrolidinium salts, phosphonium salts, amnionium salts, tetralkylammonium salts, guanidinium salts, isouronium salts, and mixtures thereof. In this context, the listed salts include any compound that contains the listed cation. In another embodiment, the ionic liquid is selected from a subset of the previous list and includes phosphonium salts, ammonium salts, tetralkylammonium salts, guanidinium salts, isouronium salts, and mixtures thereof. In one embodiment, the ionic liquid includes a cation component selected from mono-substituted iinidazoliums, di-substituted imidazoliums, tri-substituted imidazoliums, pyridiniums, pyrrolidiniums, phosphoniums, ammoniums, tetralkylammoniums, guanidiniums, and uroniums; and an anion component selected from acetate, cyanates, decanoates, halogenides, sulfates, sulfonates, amides, imides, methanes, borates, phosphates, antimonates, tetrachloroaluminate, thiocyanate, tosylate, carboxylate, cobalt-tetracarbonyl, trifluoroacetate and tris(trifiuoromethylsulfonyl)methide. Halogenide anions include chloride, bromide, and iodide. Sulfates and sulfonate anions include methyl sulfate, ethyl sulfate, butyl sulfate, hexyl sulfate, octyl sulfate, hydrogen sulfate, methane sulfonate, dodecylbenzene sulfonate, dimethyleneglycol-monomethylether sulfate, and trifluoromethane sulfonate. Amides, imides, and methane anions include dicyanamide, bis(pentafluoroethylsulfonyl)imide, bis(trifluoromethylsulfonyl)imide, and bis(trifluoromethyl)imide. Borate anions include tetrafluoroborate, tetracyanoborate, bis[oxalato(2-)]borate, bis[1,2-benzenediolato(2-)—O,O']borate, and bis[salicylato(2-)]borate. Phosphate and phosphinate anions include hexafluorophosphate, diethyiphosphate, bis(pentafluoroethyl)phosphinate, tris(pentafluoroethyl)trifluorophosphate, and tris(nonafluorohutyl) trifluorophosphate. Anitmonate anions include hexafluoroantimnonate. Other anions include tetrachloroaluminate, acetate, thiocyanate, tosylate, carboxylate, cobalt-tetracarbonyl, trifluoroacetate and tris(trifluoromethylsulfonyl)methide. Various ionic liquids are available from BASF, Merck, Strem Chemicals, and Aldrich.

Preferred ionic liquids used in the present invention may be divided into the following categories: standard, acidic, acidic water reactive, and basic. Standard ionic liquids include but are not limited to 1-ethyl-3-methylimidazolium chloride, 1-ethyl-3-methylimidazolium methanesulfonate, 1-butyl-3-methylimidazolium chloride, 1-butyl-3-methylimidazolium methanesulfonate, methyl-tri-n-butylammonium methylsulfate, 1-ethyl-2,3-dimethylimidazolium ethylsulfate, 1,2,3-trimethylimidazolium methylsulfate. Acidic ionic liquids include methylimidazolium chloride, methylimidazolium hydrogensulfate, 1-ethyl-3-methylimidazolium hydrogensulfate, 1-butyl-3-methylimidazolium hydrogensulfate.

Acidic water reactive liquids include 1-ethyl-3-methylimidazolium tetrachloroaluminate and 1-butyl-3-methylimidazolium tetrachloroaluminate. Basic ionic liquids include 1-ethyl-3-methylimidazolium acetate and 1-butyl-3-methylimidazolium acetate.

Another way the preferred ionic liquids in the present invention may be categorized is by functional group of the cation. This includes but is not limited to the following categories: mono-substituted imidazoliums, di-substituted imidazoliums, tri-substituted imidazoliums, pyridiniums, pyrrolidiniums, phosphoniums, ammoniums, tetralkylammoniums, guanidiniums, and uroniums. Mono-substituted imidazolium ionic liquids include 1-methylimidazolium tosylate, 1-methylimidazolium tetrafluoroborate, 1-methylimidazolium hexafluorophosphate, 1-methylimidazolium tifluoromethanesulfonate, 1-butylimidazolium tosylate, 1-butylimidazolium tetrafluoroborate, 1-methylimidazolium hexafluorophosphate, 1-methylimidazolium tifluoromethanesulfonate.

Di-substituted imidazolium ionic liquids include 1,3-dimethylimidiazolium methylsulfate, 1,3-dimethylimidiazolium trifluoromethanesulfonate, 1,3-dimethylimidiazolium bis(pentafluoroethyl)phosphinate, 1-ethyl-3-methylimidiazolium thiocyanate, 1-ethyl-3-methylimidiazolium dicyanamide, 1-ethyl-3-methylimidiazolium cobalt-tetracarbonyl, 1-propyl-3-methylimidazolium chloride, 1-butyl-3-methylimidazolium hexafluoroantimonate, 1-octadecyl-3-methylimidazolium bis(trifluoromethylsulfonyl)imide, 1-benzyl-3-methylimidazolium bromide, 1-phenylpropyl-3-methylimidazolium chloride.

Tri-substituted imidazolium ionic liquids include 1-ethyl-2,3-dimethylimidazolium chloride, 1-butyl-2,3-dimethylimidazolium octylsulfate, 1-propyl-2,3-dimethylimidazolium chloride, 1-hexyl-2,3-dimethylimidazolium tetrafluoroborate, 1-hexadecyl-2,3-dimethylimidazolium iodide. Pyridinium ionic liquids include n-ethylpyridinium chloride, n-butylpyridinium bromide, n-hexylpyridinium n-octylpyridinium chloride, 3-methyl-n-butylpyridinium methylsulfate, 3-ethyl-n-butylpyridinium hexafluorophosphate, 4-methyl-n-butylpyridinium bromide, 3,4-dimethyl-n-butylpyridinium chloride, 3,5-dimethyl-n-butylpyridinium chloride.

Pyrrolidinium ionic liquids include 1,1-dimethylpyrrolidinium tris(pentafluoroethyl)trifluorophosphate, 1-ethyl-1-methylpyrrolidinium dicyanamide, 1,1-dipropylpyrrolidinium bis(trifluoromethylsulfonyl)imide, 1-butyl-1-methylpyrrolidinium bromide, 1-butyl-1-ethylpyrrolidinium bromide, 1-octyl-1-methylpyrrolidinium dicyanamide.

Phosphonium ionic liquids include tetraoctylphosphonium bromide, tetrabutylphosphonium bis[oxalato(2-)]-borate, trihexyl(tetradecyl)phosphonium dicyanamide, benzyltriphenylphosphonium bis(trifluoromethyl)imide, tri-iso-butyl(methyl)phosphonium tosylate, ethyl(tributyl)phosphonium diethylphosphate, tributyl(hexadecyl)phosphonium chloride.

Ammonium ionic liquids include tetramethylammonium bis(trifluoromethylsulfonyl)imide, tetraethylammonium bis-[salicylato-(2-)]-borate, tetrabutylammonium tetracyanoborate, methyltrioctylammonium trifluoroacetat.

Guanidinium ionic liquids include N,N,N',N',N"-pentamethyl-N"-isopropylguanidinium tris(pentafluoroethyl)trifluorophosphate, N,N,N',N',N"-pentamethyl-N"-isopropylguanidinium tris(pentafluoroethyl)trifluoromethanesulfonate, hexamethylguanidinium trs(pentafluoroethyl)trifluorophosphate, hexamethylguanidinium trifluoromethanesulfonate.

Uronium ionic liquids include S-methyl-N,N,N',N'-tetramethylisouronium trifluoromethanesulfonate, O-methyl- N,N,N',N'-tetramethylisouronium tris(pentafluoroethyl)trifluorophosphate, O-ethyl-N,N,N', N'-tetramethylisouronium tris(pentafluoroethyl)trifluorophosphate, S-ethyl-N,N,N',N'-tetramethylisouronium trifluoromethanesulfonate, S-ethyl-N,N,N', N'-tetramethylisothiouronium trifluoromethanesulfonate.

In one embodiment, the ionic liquid used to store a fluid does not include imidazolium compounds. In another embodiment, the ionic liquid used to store a fluid does not include a nitrogen-containing heterocyclic cation.

The fluids which may be stored, purified, or stabilized in the ionic liquids include, but are not limited to, alcohols, aldehydes, amines, ammonia, aromatic hydrocarbons, arsenic pentafluoride, arsine, boron trichloride, boron trifluoride, carbon dioxide, carbon disulfide, carbon monoxide, carbon sulfide, chlorine, diborane, dichlorosilane, digermane, dimethyl disulfide, dimethyl sulfide, disilane, ethane, ethers, ethylene oxide, fluorine, germane, germanium methoxide, germanium tetrafluoride, hafnium methylethylamide, hafnium t-butoxide, halogenated hydrocarbons, halogens, hexane, hydrogen, hydrogen cyanide, hydrogen halogenides, hydrogen selenide, hydrogen sulfide, ketones, mercaptans, methane, nitric oxides, nitrogen, nitrogen trifluoride, noble gases, organometallics, oxygen, oxygenated-halogenated hydrocarbons, phosgene, phosphine, phosphorus trifluoride, n-silane, pentakisdimethylamino tantalum, propane, silicon tetrachloride, silicon tetrafluoride, stibine, styrene, sulfur dioxide, sulfur hexafluoride, sulfur tetrafluoride, tetramethyl cyclotetrasiloxane, titanium diethylamide, titanium dimethylamide, trichlorosilane, trimethyl silane, tungsten hexafluoride, water, and mixtures thereof.

In another embodiment, the fluids which may be stored, purified, or stabilized in the ionic liquids includes a subset of the previous listed fluids and include alcohols, aldehydes, amines, ammonia, aromatic hydrocarbons, arsenic pentafluoride, arsine, boron trichloride, boron trifluoride, carbon disulfide, carbon monoxide, carbon sulfide, chlorine, diborane, dichlorosilane, digermane, dimethyl disulfide, dimethyl sulfide, disilane, ethers, ethylene oxide, fluorine, germane, germanium methoxide, germanium tetrafluoride, hafnium methylethylamide, hafnium t-butoxide, halogenated hydrocarbons, halogens, hexane, hydrogen, hydrogen cyanide, hydrogen halogenides, hydrogen selenide, hydrogen sulfide, ketones, mercaptans, nitric oxides, nitrogen, nitrogen trifluoride, organometallics, oxygenated-halogenated hydrocarbons, phosgene, phosphine, phosphorus trifluoride, n-silane, pentakisdimethylamino tantalum, silicon tetrachloride, silicon tetrafluoride, stibine, styrene, sulfur dioxide, sulfur hexafluoride, sulfur tetrafluoride, tetramethyl cyclotetrasiloxane, titanium diethylamide, titanium dimethylamide, trichlorosilane, trimethyl silane, tungsten hexafluoride, and mixtures thereof.

By way of illustration, examples of some of these classes of fluids will now be listed. However, scope of the invention is not limited to the following examples. Alcohols include ethanol, isopropanol, and methanol. Aldehydes include acetaldehyde. Amines include dimethylamine and monomethylamine. Aromatic compounds include benzene, toluene, and xylene. Ethers include dimethyl ether, and vinyl methyl ether. Halogens include chlorine, fluorine, and bromine. Halogenated hydrocarbons include dichlorodifluoromethane, tetrafluoromethane, clorodifluoromethane, trifluoromethane, difluoromethane, methyl fluoride, 1,2-dichlorotetrafluoroethane, hexafluoroethane, pentafluoroethane, halocarbon 134a tetrafluoroethane, difluoroethane, perfluoropropane, octafluorocyclobutane, chlorotrifluoroethylene, hexafluoropropylene, octafluorocyclopentane, perfluoropropane, 1,1,1-trichloroethane, 1,1,2-trichloroethane, methyl chloride, and methyl fluoride. Ketones include acetone. Mercaptans include ethyl mercaptan, methyl mercaptan, propyl mercaptan, and n,s,t-butyl mercaptan. Nitrogen oxides include nitrogen oxide, nitrogen dioxide, and nitrous oxide. Organometallics include trimethylaluminum, triethylaluminum, dimethylethylamine alane, trimethylamine alane, dimethylaluminum hydride, tritertiarybutylaluminum, Tritertiarybutylaluminum trimethylindium (TMI), trimethylgallium (TMG), triethylgallium (TEG), dimethylzinc (DMZ), diethylzinc (DEZ), carbontetrabromide ($CBr_4$), diethyltellurium (DETe) and magnesocene ($Cp_2Mg$). Oxygenated-halogenated-hydrocarbons include perfluoroethylmethylether, perfluoromethylpropylether, perfluorodimethoxymethane, and hexafluoropropylene oxide. Other fluids include vinyl acetylene, acrylonitrile, and vinyl chloride.

Other fluids which may be stored, purified, or stabilized in ionic liquids include materials used for thin film deposition applications. Such materials include, but are not limited to, tetramethyl cyclotetrasiloxane (TOMCTS), titanium dimethylamide (TDMAT), titanium diethylamide (TDEAT), hafnium t-butoxide (Hf(OtBu)4), germaniummethoxide (Ge(OMe)4), pentakisdimethylamino tantalum (PDMAT) hafnium methylethylamide (TEMAH) and mixtures thereof.

The fluids which may be stored in the ionic liquids may be divided into categories including include stable gases, stable liquefied gases, unstable gases, and unstable liquefied gases. The term stable is relative and includes gases which do not substantially decompose over the shelf life of a storage vessel at the typical temperatures and pressures at which those skilled in the art would store the gases. Unstable refers to materials which are prone to decomposition under typical storage conditions and thus are difficult to store.

Stable gases include include nitrogen, argon, helium, neon, xenon, krypton; hydrocarbons include methane, ethane, and propanes; hydrides include silane, disilane, arsine, phosphine, germane, ammonia; corrosives include hydrogen halogenides such as hydrogen chloride, hydrogen bromide, and hydrogen fluoride, as well as chlorine, dichlorosilane, trichlorosilane, carbon tetrachloride, boron trichloride, tungsten hexafluoride, and boron trifluoride; oxygenates include oxygen, carbon dioxide, nitrous oxide, and carbon monoxide; and other gases such as hydrogen, deuterium, dimethyl ether, sulfur hexafluoride, arsenic pentafluoride, and silicon tetrafluoride.

Stable liquefied gases include inerts such as nitrogen and argon; hydrocarbons such as propane; hydrides such as silane, disilane, arsine, phosphine, germane, and ammonia; fluorinates such as hexafluoroethane, perfluoropropane, and perfluorobutane; corrosives such as hydrogen chloride, hydrogen bromide, hydrogen fluoride, chlorine, dichlorosilane, trichlorosilane, carbon tetrachloride, boron trichloride, boron trifluoride, tungsten hexafluoride, and chlorine trifluoride; and oxygenates such as oxygen and nitrous oxide.

Unstable gases include digermane, borane, diborane, stibene, disilane, hydrogen selenide, nitric oxide, fluorine and organometallics including alanes, trimethyl aluminum and other similar gases. These unstable gases may also be liquefied.

In one embodiment, a fluid such as fluorine could be stored with fully fluorinated ionic liquid such as perfluorinated ammonium hexafluorophosphate.

Figure 3:
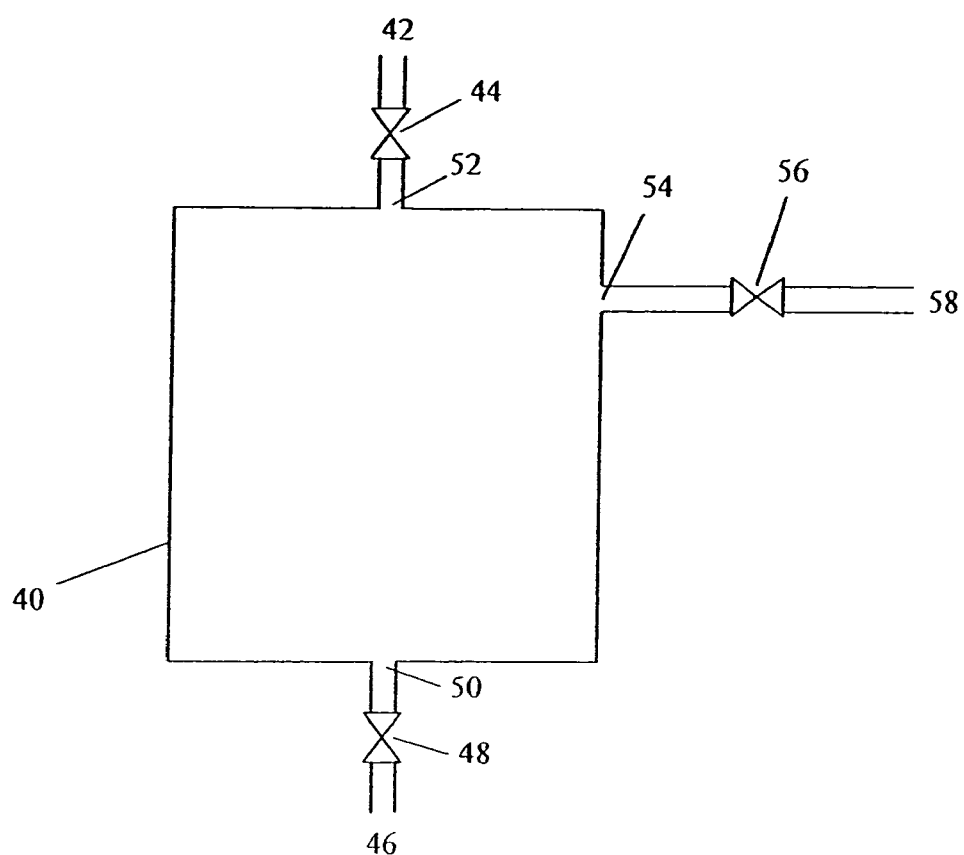
FIG. 3 shows an embodiment of a device for purifying a fluid with an ionic liquid.

The present invention also provides a method of separating an impurity from a fluid mixture. In this instance, the fluid mixture includes a fluid and the impurity. FIG. 3 shows an embodiment of a device 40 for purifying a fluid with an ionic liquid. A device containing the ionic liquid is configured for contacting the ionic liquid with the fluid mixture. A source 46 for the fluid mixture is controlled by valve 48. The fluid mixture is introduced through inlet 50 into the device 40 and contacted with the ionic liquid. The ionic liquid is introduced through inlet 52 from ionic liquid source 42 by valve 44. A portion of the impurities is retained within the ionic liquid to produce a purified fluid. The purified fluid is released from the device through outlet 54, which is controlled by valve 56.

Figure 4:
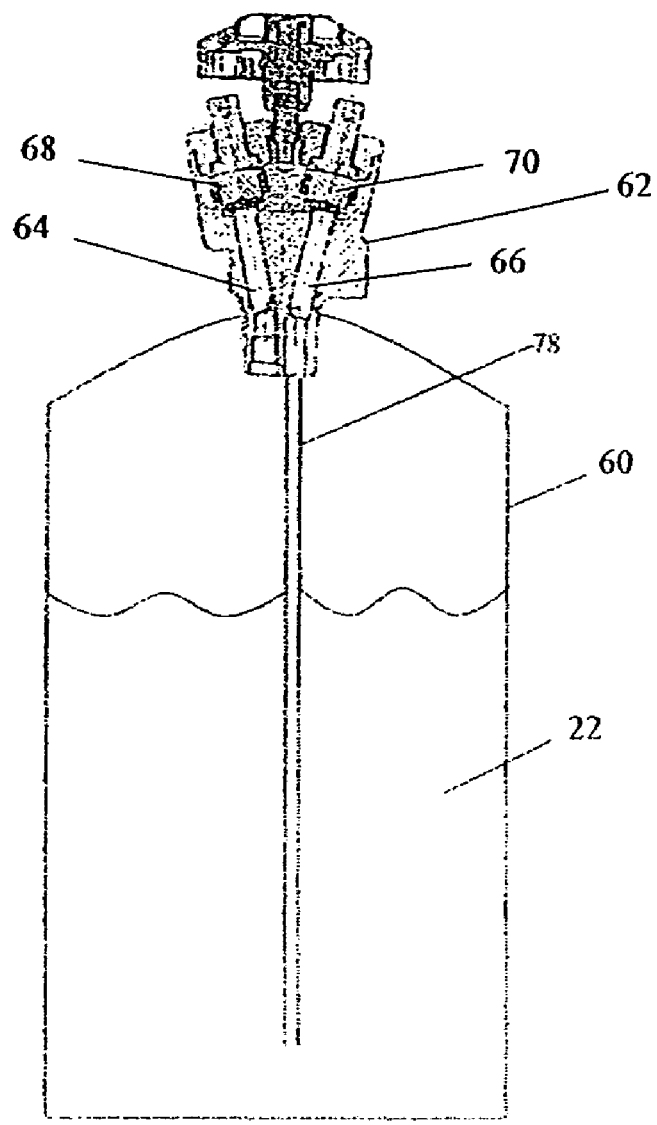
FIG. 4 shows another embodiment of a device for purifying a fluid with an ionic liquid.

FIG. 4 shows another embodiment of a device 40 for purifying a fluid with an ionic liquid. Contacting the fluid with the ionic liquid comprises bubbling the fluid mixture through the ionic liquid. The vessel 60 includes a valve assembly 62, an ionic liquid inlet 64, a fluid inlet 66, and a dip tube 78. The valve assembly 62 includes an ionic liquid inlet valve 68 and a fluid inlet valve 70. The vessel 60 is charged with an ionic liquid 22 through inlet 64. The vessel 60 is charged with a fluid through inlet 66 and through dip tube 78, from whence it bubbles through ionic liquid 22.

Alternatively, as will be described below, the impurity may retained on a solid material that has been introduced into the ionic liquid. In addition, mixtures of one or more ionic liquids can be used with or without the additional solid phase purification material to adjust the solubility of the fluid as well as the purifying ability of the ionic liquid. Additionally, non-ionic liquids can be mixed with the ionic liquids to either capture impurities present in the fluid or to substantially modify the impurities into a form that is retained by the purifying liquid or ionic liquid. The net effect is that the impurities are separated from the fluid and the purified fluid is then released from the device.

It is understood that the fluid and fluid mixture may include liquids, vapors (volatilized liquids), gaseous compounds, and/or gaseous elements. Furthermore, while reference is made to "purified," it is understood that purified may include purification to be essentially free of one or more impurities, or simply lowering the lower level of impurities in the fluid mixture. Impurities include any substance that may be desirable to have removed from the fluid mixture, or are undesirable within the fluid mixture. Impurities included can be variants or analogs of the fluid itself if they are undesirable. Impurities that would typically be desired to be removed include but are not limited to water, $CO_2$, oxygen, CO, NO, $NO_2$ $N_2O_4$, $SO_2$, $SO_3$, SO, $S_2O_2$, $SO_4$, and mixtures thereof. Additionally, impurities include but are not limited to derivatives of the fluid of interest. For example, higher boranes are considered impurities within diborane. Disilane is considered an impurity in silane. Phosphine could be considered an impurity in arsine, and HF could be considered an impurity in $BF_3$.

The ionic liquid used in the purification process may be any of the previously mentioned ionic liquids. However, it should be understood that certain ionic liquids will be better suited to removing certain impurities. It should also be understood that certain ionic liquids will be better suited to working with certain fluids. In one embodiment, the ionic liquid used for purification does not comprise a nitrogen-containing heterocyclic cation. The fluid which may be purified includes any of the previously mentioned fluids. In one embodiment, the method is not used to purify any of the following fluids: carbon dioxide, water, methane, ethane, propane, noble gases, oxygen, nitrogen, or hydrogen.

Contacting the ionic liquid with the fluid mixture may be accomplished in any of the variety of ways. The process is selected to promote intimate mixing of the liquid ionic compound and the fluid mixture and is conducted for a time sufficient to allow significant removal of targeted components. Thus, systems maximizing surface area contact between the ionic liquid and the fluid mixture are desirable.

In one embodiment, the device is a vessel and the step of contacting the fluid mixture with the ionic liquid comprises bubbling the fluid mixture through the ionic liquid, as shown in FIG. 4 and previously described. In another embodiment, a scrubbing stack is used to contact the fluid mixture with the ionic liquid, with the fluid mixture and the ionic liquid flowing into the scrubbing stack. In another embodiment, the vessel containing the fluid and the ionic liquid is mechanically agitated in order to contact the fluid with the ionic liquid. In another embodiment, countercurrent flow of the ionic liquid and the fluid is used to contact the fluid with the ionic liquid in the device. In another embodiment, the fluid is a liquid, and the liquid and the ionic liquid are mixed to contact the fluid with the ionic liquid in the device.

In another aspect of the invention, a method of separating an impurity from a fluid mixture is provided which used a small amount of ionic liquid. The fluid mixture is contacted with the ionic liquid for the purpose of purification only and not for uptake of the fluid by the ionic liquid. Thus, a device or vessel is used to contact a small amount of ionic liquid with the fluid mixture. In this manner, a substantially less amount of ionic liquid could be required to obtain the purification effect compared to the previous illustration wherein the unstable fluid could be taken up completely or dissolved within the ionic liquid. A portion of the impurity is retained within the ionic liquid to produce a purified fluid.

In another aspect of the invention, a method of stabilizing an unstable fluid is provided which uses a small amount of ionic liquid. The unstable fluid is contacted with the ionic liquid for the purpose of stabilization only and not for uptake of the fluid by the ionic liquid. Thus, a device or vessel is used to contact a small amount of ionic liquid with the fluid. In this manner, a substantially less amount of ionic liquid could be required to obtain the stabilization effect compared to an illustration wherein the unstable fluid could be taken up completely or dissolved within the ionic liquid. No decomposition products, or substantially less decomposition products, are produced as a result of the contact of the unstable fluid with the ionic liquid, producing a stabilized fluid.

Ionic liquids which have been dried or baked, thus leaving them substantially anhydrous, may exhibit greater overall capacity for removing some gaseous components. The presence of water or other impurities in the ionic liquid may reduce the capacity of the ionic liquid for dissolving fluid components. In addition, the presence of water or other impurities may decrease the solubility of certain fluid components, especially those fluid components that are hydrophobic. Dried baked ionic liquid may exhibit differential selectivities between various fluid components when compared to those ionic liquids containing measurable amounts of dissolved water, such as ionic liquids having been exposed to humid atmospheres. Ionic liquids may be dried by conventional methods, such as by heat treatment, exposure to a reduced pressure environment, or a combination of heat and reduced pressure.

It is known that gas solubility in various liquids, including ionic liquids, is dependent upon temperature and pressure. Different gas components may each elicit a different sensitivity to temperature and/or pressure changes as pertains to the solubility of the gas component in the ionic liquids. This differential temperature and/or temperature dependence may be advantageously exploited by conducting variations of the process of the present invention at different temperatures and pressures to optimize gas component separation.

The present invention also provides a method for both storing and purifying a fluid mixture comprising a fluid and an impurity. A vessel contains an ionic liquid and is configured for contacting the ionic liquid with the fluid mixture. The fluid and the ionic liquid may be any of the previously mentioned fluids and ionic liquids. The fluid is contacted with the ionic liquid for take-up of the fluid by the ionic liquid. This may be accomplished by any of the previously decribed methods of promoting intimate mixing of the liquid ionic compound and the fluid mixture, or any other suitable method. A portion of the impurities is retained within the ionic liquid to produce a purified fluid. The purified fluid can then be released from the device.

The present invention also provides a method of storing and stabilizing an unstable fluid. The unstable fluid may be any of the previously mention unstable fluids, or any other fluid that tends to decompose. The ionic liquid may be any of the previously mentioned ionic liquids. The unstable fluid is contacted with the ionic liquid for take-up of the unstable fluid by the ionic liquid. The unstable fluid may be then stored within the ionic liquid for a period of time, during which period of time the decomposition rate is at least reduced, and preferably there is substantially no decomposition of the unstable fluid. In one embodiment, the rate of decomposition is reduced by at least about 50%, more preferably at least about 75%, and most preferably at least about 90%, compared with storage of the fluid under the same temperature and pressure conditions without using an ionic liquid. In the context of an unstable fluid, substantially no decomposition means that less than 10% of the molecules of the unstable fluid undergo a chemical change while being stored. In one embodiment, the proportion of molecules that undergo a decomposition reaction is preferably less than 1%, more preferably less than 0.1%, and most preferably less than 0.01%. Although it is most preferable for the decomposition rate to be less than 0.01%, it should be noted that in certain applications a rate of decomposition of less than 50% over the storage period of the fluid would be useful. The period of time may range from a few minutes to several years, but is preferably at least about 1 hour, more preferably at least about 24 hours, even more preferably at least about 7 days, and most preferably at least about 1 month.

The unstable fluid may be selected from categories such as dopants, dielectrics, etchants, thin film growth, cleaning, and other semiconductor processes. Examples of unstable fluids include, but are not limited to, digermane, borane, diborane, disilane, fluorine, halogenated oxy-hydrocarbons, hydrogen selenide, stibene, nitric oxide, organometallics and mixtures thereof.

The present invention also provides a method of storing and purifying a fluid mixture. The storage vessel is provided with a purifying solid or liquid for contact with the fluid mixture. The purifying solid or liquid retains at least a portion of the impurity in the fluid mixture to produce a purified fluid when the fluid is released from the storage vessel. The purifying solid or liquid may be used with any of the previously mentioned fluids and ionic liquids.

Various purifying materials may be used with the present invention. The purification or impurity removal can be used to remove impurities from the ionic liquid which could change the solubility of a fluid in the ionic liquid. Alternatively, the purification material could remove only impurities present in the incoming gas or contributed from the fluid storage vessel that will be stored in the ionic liquid. Finally, the purification material could have the ability to remove impurities from both the fluid of interest and the ionic liquid simultaneously. The purification materials include, but are not limited to, alumina, amorphous silica-alumina, silica ($SiO_2$), aluminosilicate molecular sieves, titania ($TiO_2$), zirconia ($ZrO_2$), and carbon. The materials are commercially available in a variety of shapes of different sizes, including, but not limited to, beads, sheets, extrudates, powders, tablets, etc. The surface of the materials can be coated with a thin layer of a particular form of the metal (e.g., a metal oxide or a metal salt) using methods known to those skilled in the art, including, but not limited to, incipient wetness impregnation techniques, ion exchange methods, vapor deposition, spraying of reagent solutions, co-precipitation, physical mixing, etc. The metal can consist of alkali, alkaline earth or transition metals. Commercially available purification materials includes a substrate coated with a thin layer of metal oxide (known as NHX-Plus™) for removing $H_2O$, $CO_2$ and $O_2$, $H_2S$ and hydride impurities, such as silane, germane and siloxanes; ultra-low emission (ULE) carbon materials (known as HCX™) designed to remove trace hydrocarbons from inert gases and hydrogen; macroreticulate polymer scavengers (known as OMA™ and OMX-Plus™) for removing oxygenated species ($H_2O$, $O_2$, CO, $CO_2$, $NO_x$, $SO_x$, etc.) and non-methane hydrocarbons; and inorganic silicate materials (known as MTX™) for removing moisture and metals. All of these are available from Matheson Tri-Gas™, Newark, Calif. Further information on these purifying materials and other purification materials is disclosed in U.S. Pat. Nos. 4,603,148; 4,604,270; 4,659,552; 4,696,953; 4,716,181; 4,867,960; 6,110,258; 6,395,070; 6,461,411; 6,425,946; 6,547,861; and 6,733,734, the contents of which are hereby incorporated by reference. Other solid purification materials typically available from Aeronex, Millipore, Mykrolis, Saes Getters, Pall Corporation, Japan Pionics and used commonly in the semiconductor gas purification applications are known in the art and are intended to be included within the scope of the present invention.

Additionally, any of the previously described storage, stabilization, and purification methods and systems may be combined to provide multiple effects. One, two or all three methods can be independently combined to obtain a process that is best suited for the application of interest. Therefore, it is conceivable that any one method or the combination of any of the methods could be used for different requirements and applications. The basic steps of these combined methods will now be set forth. It will be apparent that the information previously described for the individual methods will also be applicable for the combined methods described below. The fluids and the ionic liquids used in the combined processes may be any of the previously mentioned fluids and ionic liquids.

The storage method may be combined with the method of purifying using a purifying solid. In this method, a vessel containing an ionic liquid is provided. The fluid mixture is contacted with the ionic liquid for take-up of the fluid by the ionic liquid. There is substantially no chemical change in the ionic liquid and the fluid. A purifying solid is provided for contact with the fluid mixture. A portion of the impurity is retained by the purifying solid to produce a purified fluid.

The methods of storage, stabilizing, and purifying using a purifying solid may also be combined. A vessel containing an ionic liquid is provided. The fluid mixture fluid is contacted with the ionic liquid for take-up of the fluid mixture by the ionic liquid. A purifying solid is provided for contact with the fluid mixture. A portion of the impurity is retained by the purifying solid to produce a purified fluid. The ionic liquid is stored for a period of time of at least about 1 hour, during which period of time there is substantially no degradation of the unstable fluid.

The methods of storage, stabilizing, and purifying using the ionic liquid may also be combined. A device containing an ionic liquid and configured for contacting the ionic liquid with the fluid mixture is provided. The fluid mixture is introduced into the device. The fluid mixture is contacted with the ionic liquid. The fluid mixture may then be stored within the ionic liquid for a period of time of at least about 1 hour, during which period of time there is substantially no degradation of the unstable fluid. A portion of the impurities are retained within the ionic liquid to produce a purified unstable fluid, and the purified unstable fluid may then be released from the device.

The two purification methods may also be combined. A device containing an ionic liquid and a purifying solid therein for contact with the fluid mixture is provided. The fluid mixture is introduced into the device. The fluid mixture is contacted with the ionic liquid and with the purifying solid. A first portion of the impurity is retained within the ionic liquid and a second portion of the impurity is retained by the purifying solid, to produce a purified fluid. The purified fluid may then be released from the device.

The storage method may be combined with both methods of purifying. A vessel containing an ionic liquid and a purifying solid therein for contact with the fluid mixture is provided. The fluid is contacted with the ionic liquid for take-up of the fluid by the ionic liquid. A first portion of the impurity is retained within the ionic liquid and a second portion of the impurity is retained by the purifying solid, to produce a purified fluid. The purified fluid may then be released from the device.

The storage and stabilization methods may be combined with both methods of purifying. A vessel containing an ionic liquid and a purifying solid therein for contact with the fluid mixture is provided. The fluid mixture is introduced into the device. The fluid is contacted with the ionic liquid for take-up of the fluid by the ionic liquid. The fluid mixture is stored within the ionic liquid for a period of time of at least about 1 hour, during which period of time there is substantially no degradation of the unstable fluid. A first portion of the impurity is retained within the ionic liquid and a second portion of the impurity is retained by the purifying solid, to produce a purified unstable fluid. The purified fluid may then be released from the device.

The stabilization methods may be combined with both methods of purifying. A vessel containing an ionic liquid and a purifying solid therein for contact with the fluid mixture is provided. The unstable fluid mixture is introduced into the device. The unstable fluid is contacted with the ionic liquid primarily for the purposes of stabilization and purification only, and not for the purposes of uptake of the fluid by the ionic liquid. Thus, a device or vessel is used to contact a small amount of ionic liquid with the fluid. In this manner, a substantially less amount of ionic liquid could be required to obtain the stabilization effect and the purification effect compared to the previous illustrations wherein the unstable fluid could be taken up completely or dissolved within the ionic liquid. No decomposition products, or substantially less decomposition products, are produced as a result of the contact of the unstable fluid with the ionic liquid, producing a stabilized fluid. The fluid mixture is stored within the ionic liquid for a period of time of at least about 1 hour, during which period of time there is substantially no degradation of the unstable fluid. A portion of the impurity is retained within the ionic liquid to produce a purified fluid. The purified fluid may then be released from the device.

EXAMPLES

For all the following Examples, a canister of ionic liquid is prepared by the following method. A stainless steel canister with a dip tube is charged with a known quantity of the ionic liquid. The charged canister is thermally controlled by a PID temperature controller or variac with a heating element and a thermocouple. The canister is placed on a gravimetric load cell or weight scale and a pressure gauge is connected to the canister to measure head pressure. This canister is connected to a manifold with vacuum capability and to a gas source. The canister is also connected to an analyzer (such as FT-IR, GC, APIMS, etc.).

A vacuum bake procedure is conducted on the canister charged with the ionic liquid and the manifold up to the gas cylinder, by pulling a vacuum while heating. This removes any trace moisture and other volatile impurities from the ionic liquid and the gas distribution components. The ionic liquid is allowed to cool to the desired operating temperature. The mass of the vacuum baked canister and ionic liquid is recorded.

Example 1

Storage of an Unstable Gas in Ionic Liquid—$B_2H_6$ Stored in $BMIM[PF_6]$

A canister of $BMIM[PF_6]$ is prepared as described above.

The source gas, $B_2H_6$ or a gas mixture containing $B_2H_6$, is then introduced into the canister, at 5 psig, until the uptake of $B_2H_6$ is complete. The uptake can be determined gravimetrically, or by analytical methods. For example, the concentration or absolute amount of the $B_2H_6$ can be measured at the inlet of the canister and the outlet of the canister. $B_2H_6$ will continue to be introduced until the inlet and outlet concentrations are equivalent, indicating the $BMIM[PF_6]$ fluid is saturated and cannot accept any further $B_2H_6$ under the existing conditions. At this time, the source gas flow is stopped.

The $BMIM[PF_6]$-charged canister is then heated, a pressure differential is applied, or it is sparged with an inert gas, in order to deliver the stored $B_2H_6$. The delivered gas is analyzed for $B_2H_6$ content. This can be determined gravimetrically or analytically. The total amount introduced is compared to the total amount removed to determine the loading factor of the cylinder.

Example 2

Storage of a Stable Gas in Ionic Liquid—$SiF_4$ Stored in $BMIM[PF_6]$

A canister of $BMIM[PF_6]$ is prepared as described above.

The source gas, $SiF_4$ or a gas mixture containing $SiF_4$, is then introduced into the canister, at 5 psig, until the uptake of $SiF_4$ is complete. The uptake can be determined gravimetrically, or by analytical methods. For example, the concentration or absolute amount of the $SiF_4$ can be measured at the inlet of the canister and the outlet of the canister. $SiF_4$ will continue to be introduced until the inlet and outlet amounts are equivalent, indicating the BMIM[PF6] fluid is saturated and cannot accept any further $SiF_4$ under the existing conditions. At this time, the source gas flow is stopped.

The $BMIM[PF_6]$-charged canister is stored for a period of time. It is then heated, a pressure differential is applied, or it is sparged with an inert gas, in order to deliver the stored $SiF_4$. The delivered gas is analyzed for $SiF_4$ content. This can be determined gravimetrically or analytically. The total amount introduced is compared to the total amount removed to determine the loading factor of the cylinder.

Example 3

Storage of an Unstable Compressed Liquefied Gas in Ionic Liquid—$SbH_3$ Stored in MTBS A canister of MTBS (methyl-tri-n-butylammonium methylsulfate) is prepared as described above.

The source gas, $SbH_3$ or a gas mixture containing $SbH_3$, is then introduced into the canister, at 5 psig, until the uptake of $SbH_3$ is complete. The uptake can be determined gravimetrically, or by analytical methods. For example, the concentration or absolute amount of the $SbH_3$ can be measured at the inlet of the canister and the outlet of the canister. $SbH_3$ will continue to be introduced until the inlet and outlet amounts are equivalent, indicating the MTBS fluid is saturated and cannot accept any further $SbH_3$ under the existing conditions. At this time, the source gas flow is stopped.

The MTBS-charged canister is then stored for a period of time. It is then heated, a pressure differential is applied, or it is sparged with an inert gas, in order to deliver the stored $SbH_3$. The delivered gas is analyzed for $SbH_3$ content. This can be determined gravimetrically or analytically. The total amount introduced is compared to the total amount removed to determine the loading factor of the cylinder.

Example 4

Storage of a Stable Compressed Liquefied Hydride Gas in Ionic Liquid—$PH_3$ in $BMIM[PF_6]$ A canister of $BMIM[PF_6]$ is prepared as described above.

The source gas, $PH_3$ or a gas mixture containing $PH_3$, is then introduced into the canister, at 5 psig, until the uptake of $PH_3$ is complete. The uptake can be determined gravimetrically, or by analytical methods. For example, the concentration or absolute amount of the $PH_3$ can be measured at the inlet of the canister and the outlet of the canister. $PH_3$ will continue to be introduced until the inlet and outlet amounts are equivalent, indicating the $BMIM[PF_6]$ fluid is saturated and cannot accept any further $PH_3$ under the existing conditions. At this time, the source gas flow is stopped.

The $BMIM[PF_6]$-charged canister is then heated, a pressure differential is applied, or it is sparged with an inert gas, in order to deliver the stored $PH_3$. The delivered gas is analyzed for $PH_3$ content. This can be determined gravimetrically or analytically. The total amount introduced is compared to the total amount removed to determine the loading factor of the cylinder.

Example 5

Storage of a Stable Compressed Liquefied Acid Gas in Acidic Ionic Liquid—HCl in $EMIM[AlCl_4]$ A canister of $EMIM[AlCl_4]$ is prepared as described above.

The source gas, HCl or a gas mixture containing HCl, is then introduced into the canister, at the vapor pressure of HCl, until the uptake of HCl is complete. The uptake can be determined gravimetrically, or by analytical methods. For example, the concentration or absolute amount of the HCl can be measured at the inlet of the canister and the outlet of the canister. HCl will continue to be introduced until the inlet and outlet amounts are equivalent, indicating the $EMIM[AlCl_4]$ fluid is saturated and cannot accept any further HCl under the existing conditions. At this time, the source gas flow is stopped.

The $EMIM[AlCl_4]$-charged canister is then heated, a pressure differential is applied, or it is sparged with an inert gas, in order to deliver the stored HCl. The delivered gas is analyzed for HCl content. This can be determined gravimetrically or analytically. The total amount introduced is compared to the total amount removed to determine the loading factor of the cylinder.

Example 6

Purification of an Unstable Gas with Ionic Liquid—$B_2H_6$ with $BMIM[PF_6]$

A canister of $BMIM[PF_6]$ is prepared as described above.

The source gas, $B_2H_6$ or a gas mixture containing $B_2H_6$, is then analyzed while by-passing the $BMIM[PF_6]$-charged canister, in order to determine the concentration of impurities. Once the impurity concentrations in the source gas have been established, source gas is flowed into the canister containing $BMIM[PF_6]$ at a pressure of 5 psig. The delivered gas from the outlet of the canister is analyzed for impurities.

Purification of the source $B_2H_6$ is determined by the lack of, or a decrease in the impurities detected in the delivered gas compared to the source gas. The capacity of the $BMIM[PF_6]$ for impurities is calculated by measuring the total moles of impurities removed for the moles of $BMIM[PF_6]$ with which the canister was charged.

Example 7

Purification of a Stable Gas with Ionic Liquid—$SiF_4$ with $BMIM[PF_6]$

A canister of $BMIM[PF_6]$ is prepared as described above.

The source gas, $SiF_4$ or a gas mixture containing $SiF_4$, is then analyzed while by-passing the $BMIM[PF_6]$-charged canister, in order to determine the concentration of impurities. Once the impurity concentrations in the source gas have been established, source gas is flowed into the canister containing $BMIM[PF_6]$ at a pressure of 5 psig. The delivered gas from the outlet of the canister is analyzed for impurities Purification of the source $SiF_4$ is determined by the lack of, or a decrease in the impurities detected in the delivered gas compared to the source gas. The capacity of the $BMIM[PF_6]$ for impurities is calculated by measuring the total moles of impurities removed for the moles of $BMIM[PF_6]$ with which the canister was charged.

Example 8

Purification of an Unstable Compressed Liquefied Gas with Ionic Liquid—$SbH_3$ with MTBS A canister of MTBS is prepared as described above.

The source gas, $SbH_3$ or a gas mixture containing $SbH_3$, is then analyzed while by-passing the MTBS-charged canister, in order to determine the concentration of impurities. Once the impurity concentrations in the source gas have been established, source gas is flowed into the canister containing MTBS at a pressure of 5 psig. The delivered gas from the outlet of the canister is analyzed for impurities.

Purification of the source $SbH_3$ is determined by the lack of, or a decrease in the impurities detected in the delivered gas compared to the source gas. The capacity of the MTBS for impurities is calculated by measuring the total moles of impurities removed for the moles of MTBS with which the canister was charged.

Example 9

Purification of an Unstable Compressed Liquefied Gas in the Liquid Phase with Ionic Liquid—$SbH_3$ with MTBS A canister of MTBS is prepared as described above.

The liquid phase source material, $SbH_3$, is flowed through the apparatus, by-passing the MTBS-charged canister, vaporized, and analyzed in order to determine the concentration of impurities. Once the impurity levels in the source fluid have been established, liquid phase source material is flowed into the canister containing MTBS, at the vapor pressure of $SbH_3$. The delivered liquid from the outlet of the canister is vaporized and analyzed to determine the concentration of the impurities.

Purification of the source $SbH_3$ is determined by the lack of, or a decrease in the impurities detected in the delivered liquid when compared to the source liquid, as determined by analysis in the vapor phase. The capacity of the MTBS for impurities is calculated by measuring the total moles of impurities removed for the moles of MTBS with which the canister was charged.

Example 10

Purification of a Stable Compressed Liquefied Hydride Gas with Ionic Liquid—$PH_3$ with $BMIM[PF_6]$ A canister of $BMIM[PF_6]$ is prepared as described above.

The source gas, $PH_3$ or a gas mixture containing $PH_3$, is analyzed while by-passing the $BMIM[PF_6]$-charged canister, in order to determine the concentration of impurities. Once the impurity concentrations in the source gas have been established, source gas is flowed into the canister containing $BMIM[PF_6]$ at the vapor pressure of $PH_3$. The delivered gas from the outlet of the canister is analyzed for impurities.

Purification of the stored $PH_3$ is determined by the lack of, or a decrease in the impurities detected in the delivered gas compared to the source gas. The capacity of the $BMIM[PF_6]$ for impurities is calculated by measuring the total moles of impurities removed for the moles of $BMIM[PF_6]$ with which the canister was charged.

Example 11

Purification of a Stable Compressed Liquefied Acid Gas with Ionic Liquid—HCl with $EMIM[AlCl_4]$ A canister of $EMIM[AlCl_4]$ is prepared as described above.

The source gas, HCl or a gas mixture containing HCl, is analyzed while by-passing the $EMIM[AlCl_4]$-charged canister, in order to determine the concentration of moisture. Once the $H_2O$ concentration in the source gas have been established, source gas is flowed into the canister containing $EMIM[AlCl_4]$ at a pressure of 5 psig. The gas is bubbled through the $EMIM[AlCl_4]$ inside the canister and the delivered gas at the outlet of the canister is analyzed to measure the moisture content.

Purification of the stored HCl is determined by the lack of, or a decrease in the $H_2O$ impurity concentration detected in the delivered gas compared to the source gas. The capacity of the $EMIM[AlCl_4]$ for impurities is calculated by measuring the total moles of $H_2O$ removed for the moles of $EMIM[AlCl_4]$ with which the canister was charged.

Example 12

Purification of a Stable Compressed Liquefied Gas in the Liquid Phase with Ionic Liquid—$NH_3$ with EMIM[Acetat]

A canister of EMIM[Acetat] is prepared as described above.

The liquid phase source material, $NH_3$, is flowed through the apparatus, by-passing the EMIM[Acetat]-charged canister, vaporized, and analyzed in order to determine the concentration of impurities. Once the impurity levels in the source fluid have been established, liquid phase source material is flowed into the canister containing EMIM[Acetat], at the vapor pressure of $NH_3$. The delivered liquid from the outlet of the canister is vaporized and analyzed to determine the concentration of the impurities.

Purification of the source $NH_3$ is determined by the lack of, or a decrease in the impurities detected in the delivered liquid when compared to the source liquid, as determined by analysis in the vapor phase. The capacity of the EMIM[Acetat] for impurities is calculated by measuring the total moles of impurities removed for the moles of EMIM[Acetat] with which the canister was charged.

Example 13

Stabilization of an Unstable Gas with Ionic Liquid—$B_2H_6$ with $BMIM[PF_6]$

A canister of $BMIM[PF_6]$ is prepared as described above.

The source gas, $B_2H_6$ or a gas mixture containing $B_2H_6$, is analyzed while by-passing the $BMIM[PF_6]$-charged canister, in order to determine the concentration of $B_2H_6$ and decomposition products. Once these concentrations in the source gas have been established, source gas is flowed into the canister containing $BMIM[PF_6]$ until it has equilibrated to a pressure of 5 psig. At this time, the flow of the source material is stopped.

With the source gas flow off, the gas from the outlet of the canister containing the $BMIM[PF_6]$ is then analyzed for $B_2H_6$ and decomposition products.

Stabilization of the source $B_2H_6$ is determined by the lack of, or a decrease in the decomposition products detected in the delivered gas compared to the source gas, in addition to quantitative recovery of $B_2H_6$.

Example 14

Stabilization of an Unstable Compressed Liquefied Gas in the Liquid Phase with Ionic Liquid—$SbH_3$ with MTBS A canister of MTBS is prepared as described above.

The liquid phase source material, $SbH_3$, is flowed through the apparatus, by-passing the MTBS-charged canister, vaporized, and analyzed in order to determine the concentration of decomposition products. Once the decomposition levels in the source fluid have been established, liquid phase source material is flowed into the canister containing MTBS, at the vapor pressure of $SbH_3$. At this time, the flow of the source material is stopped.

With the source flow off, the delivered liquid from the outlet of the canister is vaporized and analyzed for $SbH_3$ and decomposition products.

Stabilization of the source $SbH_3$ is determined by the lack of, or a decrease in the decomposition products detected in the delivered gas compared to the source gas, in addition to quantitative recovery of $SbH_3$.

Example 15

Storage and Purification of an Unstable Gas in Ionic Liquid—$B_2H_6$ with BMIM[$PF_6$]

A canister of BMIM[$PF_6$] is prepared as described above.

The source gas, $B_2H_6$ or a gas mixture containing $B_2H_6$, is analyzed while by-passing the BMIM[$PF_6$]-charged canister, in order to determine the concentration of impurities. Once the impurity concentrations in the source gas have been established, source gas is flowed into the canister containing BMIM[$PF_6$] at a pressure of 5 psig, until the uptake of $B_2H_6$ is complete. The uptake can be determined gravimetrically, or by analytical methods. For example, the concentration or absolute amount of the $B_2H_6$ can be measured at the inlet of the canister and the outlet of the canister. $B_2H_6$ will continue to be introduced until the inlet and outlet concentrations are equivalent, indicating the BMIM[$PF_6$] fluid is saturated and cannot accept any further $B_2H_6$ under the existing conditions. At this time, the source gas flow is stopped.

The BMIM[$PF_6$]-charged canister is then heated, a pressure differential is applied, or it is sparged with an inert gas, in order to deliver the stored $B_2H_6$. The delivered gas from the outlet of the canister is analyzed for impurities.

The canister is then stored for a period of time. Samples of $B_2H_6$ are taken at time intervals in order to determined the stability of the $B_2H_6$ in the BMIM[$PF_6$]. Purification of the source $B_2H_6$ is determined by the lack of, or a decrease in the impurities detected in the delivered gas from the canister compared to the source gas. The capacity of the BMIM[$PF_6$] for impurities is calculated by measuring the total moles of impurities removed for the moles of BMIM[$PF6$] with which the canister was charged.

Example 16

Storage and Purification of a Stable Gas in Ionic Liquid—$SiF_4$ with BMIM[$PF_6$]

A canister of BMIM[$PF_6$] is prepared as described above.

The source gas, $SiF_4$ or a gas mixture containing $SiF_4$, is analyzed while by-passing the BMIM[$PF_6$]-charged canister, in order to determine the concentration of impurities. Once the impurity concentrations in the source gas have been established, source gas is flowed into the canister containing BMIM[$PF_6$] at a pressure of 5 psig, until the uptake of $SiF_4$ is complete. The uptake can be determined gravimetrically, or by analytical methods. For example, the concentration or absolute amount of the $SiF_4$ can be measured at the inlet of the canister and the outlet of the canister. $SiF_4$ will continue to be introduced until the inlet and outlet concentrations are equivalent, indicating the BMIM[$PF_6$] fluid is saturated and cannot accept any further $SiF_4$ under the existing conditions. At this time, the source gas flow is stopped.

The BMIM[$PF_6$]-charged canister is then heated, a pressure differential is applied, or it is sparged with an inert gas, in order to deliver the stored $SiF_4$. The delivered gas from the outlet of the canister is analyzed for impurities.

Purification of the source $SiF_4$ is determined by the lack of, or a decrease in the impurities detected in the delivered gas from the canister compared to the source gas. The capacity of the BMIM[$PF_6$] for impurities is calculated by measuring the total moles of impurities removed for the moles of BMIM[$PF_6$] with which the canister was charged.

Example 17

Storage and Purification of an Unstable Compressed Liquefied Gas in Ionic Liquid—$SbH_3$ with MTBS A canister of MTBS is prepared as described above.

The source gas, $SbH_3$ or a gas mixture containing $SbH_3$, is analyzed while by-passing the MTBS-charged canister, in order to determine the concentration of impurities. Once the impurity concentrations in the source gas have been established, source gas is flowed into the canister containing MTBS at a pressure of 5 psig, until the uptake of $SbH_3$ is complete. The uptake can be determined gravimetrically, or by analytical methods. For example, the concentration or absolute amount of the $SbH_3$ can be measured at the inlet of the canister and the outlet of the canister. $SbH_3$ will continue to be introduced until the inlet and outlet concentrations are equivalent, indicating the MTBS fluid is saturated and cannot accept any further $SbH_3$ under the existing conditions. At this time, the source gas flow is stopped.

The MTBS-charged canister is then heated, a pressure differential is applied, or it is sparged with an inert gas, in order to deliver the stored $SbH_3$. The delivered gas from the outlet of the canister is analyzed for impurities.

Purification of the source $SbH_3$ is determined by the lack of, or a decrease in the impurities detected in the delivered gas from the canister compared to the source gas. The capacity of the MTBS for impurities is calculated by measuring the total moles of impurities removed for the moles of MTBS with which the canister was charged.

Example 18

Storage and Purification of a Stable Compressed Liquefied Gas in Ionic Liquid—$PH_3$ with BMIM[$PF_6$]

A canister of BMIM[$PF_6$] is prepared as described above.

The source gas, $PH_3$ or a gas mixture containing $PH_3$, is analyzed while by-passing the BMIM[$PF_6$]-charged canister, in order to determine the concentration of impurities. Once the impurity concentrations in the source gas have been established, source gas is flowed into the canister containing BMIM[$PF_6$] at a pressure of 5 psig, until the uptake of $PH_3$ is complete. The uptake can be determined gravimetrically, or by analytical methods. For example, the concentration or absolute amount of the $PH_3$ can be measured at the inlet of the canister and the outlet of the canister. $PH_3$ will continue to be introduced until the inlet and outlet concentrations are equivalent, indicating the BMIM[$PF_6$] liquid is saturated and cannot accept any further $PH_3$ under the existing conditions. At this time, the source gas flow is stopped.

The BMIM[$PF_6$]-charged canister is then heated, a pressure differential is applied, or it is sparged with an inert gas, in order to deliver the stored $PH_3$. The delivered gas from the outlet of the canister is analyzed for impurities.

Purification of the source $PH_3$ is determined by the lack of, or a decrease in the impurities detected in the delivered gas from the canister compared to the source gas. The capacity of the BMIM[$PF_6$] for impurities is calculated by measuring the total moles of impurities removed for the moles of BMIM[$PF_6$] with which the canister was charged.

Example 19

Storage and Purification of a Stable Compressed Liquefied Gas in Acidic Ionic Liquid—HCl with EMIM[AlCl$_4$]

A canister of EMIM[AlCl$_4$] is prepared as described above.

The source gas, HCl or a gas mixture containing HCl, is analyzed while by-passing the EMIM[AlCl$_4$]-charged canister, in order to determine the concentration of impurities. Once the impurity concentrations in the source gas have been established, source gas is flowed into the canister containing EMIM[AlCl$_4$] at a pressure of 5 psig, until the uptake of HCl is complete. The uptake can be determined gravimetrically, or by analytical methods. For example, the concentration or absolute amount of the HCl can be measured at the inlet of the canister and the outlet of the canister. HCl will continue to be introduced until the inlet and outlet concentrations are equivalent, indicating the EMIM[AlCl$_4$] liquid is saturated and cannot accept any further HCl under the existing conditions. At this time, the source gas flow is stopped.

The EMIM[AlCl$_4$]-charged canister is then heated, a pressure differential is applied, or it is sparged with an inert gas, in order to deliver the stored HCl. The delivered gas from the outlet of the canister is analyzed for impurities.

Purification of the source HCl is determined by the lack of, or a decrease in the impurities detected in the delivered gas from the canister compared to the source gas. The capacity of the EMIM[AlCl$_4$] for impurities is calculated by measuring the total moles of impurities removed for the moles of EMIM[AlCl$_4$] with which the canister was charged.

Example 20

Storage and Stabilization of an Unstable Gas in Ionic Liquid—B$_2$H$_6$ with BMIM[PF$_6$]

A canister of BMIM[PF$_6$] is prepared as described above.

The source gas, B$_2$H$_6$ or a gas mixture containing B2H6, is analyzed while by-passing the BMIM[PF$_6$]-charged canister, in order to determine the concentration of B$_2$H$_6$ and decomposition products. Once these concentrations in the source gas have been established, source gas is flowed into the canister containing BMIM[PF$_6$] at a pressure of 5 psig, until the uptake of B$_2$H$_6$ is complete. The uptake can be determined gravimetrically, or by analytical methods. For example, the concentration or absolute amount of the B$_2$H$_6$ can be measured at the inlet of the canister and the outlet of the canister. B$_2$H$_6$ will continue to be introduced until the inlet and outlet concentrations are equivalent, indicating the BMIM[PF$_6$] fluid is saturated and cannot accept any further B$_2$H$_6$ under the existing conditions. At this time, the source gas flow is stopped.

The BMIM[PF$_6$]-charged canister is then heated, a pressure differential is applied, or it is sparged with an inert gas, in order to deliver the stored B$_2$H$_6$. The delivered gas from the outlet of the canister is analyzed for B$_2$H$_6$ and decomposition products.

Stabilization of the source B$_2$H$_6$ is determined by the lack of, or a decrease in the decomposition products detected in the delivered gas compared to the source gas, in addition to quantitative recovery to the source material.

Example 21

Storage and Stabilization of an Unstable Compressed Liquefied Gas with Ionic Liquid—SbH$_3$ with MTBS A canister of MTBS is prepared as described above.

The source gas, SbH$_3$ or a gas mixture containing SbH$_3$, is analyzed while by-passing the MTBS-charged canister, in order to determine the concentration of SbH$_3$ and decomposition products. Once these concentrations in the source gas have been established, source gas is flowed into the canister containing MTBS at a pressure of 5 psig, until the uptake of SbH$_3$ is complete. The uptake can be determined gravimetrically, or by analytical methods. For example, the concentration or absolute amount of the SbH$_3$ can be measured at the inlet of the canister and the outlet of the canister. SbH$_3$ will continue to be introduced until the inlet and outlet concentrations are equivalent, indicating the MTBS fluid is saturated and cannot accept any further SbH$_3$ under the existing conditions. At this time, the source gas flow is stopped.

The MTBS-charged canister is then heated, a pressure differential is applied, or it is sparged with an inert gas, in order to deliver the stored SbH$_3$. The delivered gas from the outlet of the canister is analyzed for SbH$_3$ and decomposition products.

Stabilization of the source SbH$_3$ is determined by the lack of, or a decrease in the decomposition products detected in the delivered gas compared to the source gas, in addition to quantitative recovery of SbH$_3$.

Example 22

Stabilization and Purification of an Unstable Gas with Ionic Liquid—B$_2$H$_6$ with BMIM[PF$_6$]

A canister of BMIM[PF$_6$] is prepared as described above.

The source gas, B$_2$H$_6$ or a gas mixture containing B$_2$H$_6$, is analyzed while by-passing the BMIM[PF$_6$]-charged canister, in order to determine the concentration of B$_2$H$_6$, impurities, and decomposition products. Once these concentrations in the source gas have been established, source gas is flowed into the canister containing BMIM[PF$_6$] until it has equilibrated at a pressure of 5 psig. At this time, the source gas flow is stopped.

With the source gas flow off, the gas from the outlet of the canister containing the BMIM[PF$_6$] is then analyzed for B$_2$H$_6$, impurities, and decomposition products.

Stabilization of the source B$_2$H$_6$ is determined by the lack of, or a decrease in the decomposition products detected in the delivered gas compared to the source gas, in addition to quantitative recovery of B$_2$H$_6$.

Purification of the source B$_2$H$_6$ is determined by the lack of, or a decrease in the impurities detected in the delivered gas from the canister compared to the source gas. The capacity of the BMIM[PF$_6$] for impurities is calculated by measuring the total moles of impurities removed for the moles of BMIM[PF$_6$] with which the canister was charged.

Example 23

Stabilization and Purification of an Unstable Compressed Liquefied Gas with Ionic Liquid—SbH$_3$ with MTBS A canister of MTBS is prepared as described above.

The source gas, SbH$_3$ or a gas mixture containing SbH$_3$, is analyzed while by-passing the MTBS-charged canister, in order to determine the concentration of SbH$_3$, impurities, and decomposition products. Once these concentrations in the source gas have been established, source gas is flowed into the canister containing MTBS until it has equilibrated at 5 psig. At this time, the source gas flow is stopped.

With the source gas flow off, the gas from the outlet of the canister containing the MTBS is then analyzed for $SbH_3$, impurities, and decomposition products.

The MTBS-charged canister is then heated, a pressure differential is applied, or it is sparged with an inert gas, in order to deliver the stored $SbH_3$. The delivered gas from the outlet of the canister is analyzed for $SbH_3$, impurities, and decomposition products.

Stabilization of the source $SbH_3$ is determined by the lack of, or a decrease in the decomposition products detected in the delivered gas compared to the source gas, in addition to quantitative recovery of $SbH_3$.

Purification of the source $SbH_3$ is determined by the lack of, or a decrease in the impurities detected in the delivered gas from the canister compared to the source gas. The capacity of the MTBS for impurities is calculated by measuring the total moles of impurities removed for the moles of MTBS with which the canister was charged.

Example 24

Storage, Purification, and Stabilization of an Unstable Gas with Ionic Liquid—$B_2H_6$ with $BMIM[PF_6]$ A canister of $BMIM[PF_6]$ is prepared as described above.

The source gas, $B_2H_6$ or a gas mixture containing B2H6, is analyzed while by-passing the $BMIM[PF_6]$-charged canister, in order to determine the concentration of $B_2H_6$, impurities, and decomposition products. Once these concentrations in the source gas have been established, source gas is flowed into the canister containing $BMIM[PF_6]$ at a pressure of 5 psig, until the uptake of $B_2H_6$ is complete. The uptake can be determined gravimetrically, or by analytical methods. For example, the concentration or absolute amount of the $B_2H_6$ can be measured at the inlet of the canister and the outlet of the canister. $B_2H_6$ will continue to be introduced until the inlet and outlet concentrations are equivalent, indicating the $BMIM[PF_6]$ fluid is saturated and cannot accept any further $B_2H_6$ under the existing conditions. At this time, the source gas flow is stopped.

The $BMIM[PF_6]$-charged canister is then heated, a pressure differential is applied, or it is sparged with an inert gas, in order to deliver the stored $B_2H_6$. The delivered gas from the outlet of the canister is analyzed for $B_2H_6$, impurities, and decomposition products.

Stabilization of the source $B_2H_6$ is determined by the lack of, or a decrease in the decomposition products detected in the delivered gas compared to the source gas, in addition to quantitative recovery of $B_2H_6$.

Purification of the source $B_2H_6$ is determined by the lack of, or a decrease in the impurities detected in the delivered gas from the canister compared to the source gas. The capacity of the $BMIM[PF_6]$ for impurities is calculated by measuring the total moles of impurities removed for the moles of BMIM $[PF_6]$ with which the canister was charged.

Example 25

Storage, Purification, and Stabilization of an Unstable Compressed Liquefied Gas with Ionic Liquid—$SbH_3$ with MTBS A canister of MTBS is prepared as described above.

The source gas, $SbH_3$ or a gas mixture containing $SbH_3$, is analyzed while by-passing the MTBS-charged canister, in order to determine the concentration of $SbH_3$, impurities, and decomposition products. Once these concentrations in the source gas have been established, source gas is flowed into the canister containing MTBS at a pressure of 5 psig, until the uptake of $SbH_3$ is complete. The uptake can be determined gravimetrically, or by analytical methods. For example, the concentration or absolute amount of the $SbH_3$ can be measured at the inlet of the canister and the outlet of the canister. $SbH_3$ will continue to be introduced until the inlet and outlet concentrations are equivalent, indicating the MTBS fluid is saturated and cannot accept any further $SbH_3$ under the existing conditions. At this time, the source gas flow is stopped.

The MTBS-charged canister is then heated, a pressure differential is applied, or it is sparged with an inert gas, in order to deliver the stored $SbH_3$. The delivered gas from the outlet of the canister is analyzed for $SbH_3$, impurities, and decomposition products.

Stabilization of the source $SbH_3$ is determined by the lack of, or a decrease in the decomposition products detected in the delivered gas compared to the source gas, in addition to quantitative recovery of SbH3.

Purification of the source $SbH_3$ is determined by the lack of, or a decrease in the impurities detected in the delivered gas from the canister compared to the source gas. The capacity of the MTBS for impurities is calculated by measuring the total moles of impurities removed for the moles of MTBS with which the canister was charged.

The embodiments described above and shown herein are illustrative and not restrictive. The scope of the invention is indicated by the claims rather than by the foregoing description and attached drawings. The invention may be embodied in other specific forms without departing from the spirit of the invention. Accordingly, these and any other changes which come within the scope of the claims are intended to be embraced therein.

What is claimed is:

1. A method of packaging, stabilizing and purifying a fluid mixture in a vessel comprising an unstable fluid and an impurity for shipment to an end user wherein the end user can selectively dispense from the vessel the unstable fluid, by controlling either the temperature and/or the pressure gradient within the vessel, comprising:

providing the vessel configured for selectively dispensing the fluid mixture components;

providing an ionic liquid within said vessel;

providing a purifying material within said vessel;

introducing the fluid mixture into said vessel;

contacting the fluid mixture with said ionic liquid wherein said ionic liquid is selected so that when contacted together with the fluid mixture no chemical bonds are broken and the unstable fluid is taken up by said ionic liquid;

contacting the fluid mixture with the purifying material;

allowing a portion of the impurity to be retained by the purifying material to produce a purified unstable fluid; and shipping said vessel containing the fluid mixture and said ionic liquid to an end user wherein the unstable fluid may be dispensed from said vessel, separately from said ionic liquid, by controlling either the temperature and/or the pressure gradient of the ionic liquid.

2. The method of claim 1 wherein the amount of the ionic liquid within the vessel is small compared to the amount of the fluid mixture within the vessel.

3. The method of claim 1 wherein the purifying material is selected from the group consisting of metal oxide coated substrates, thermally activated alumina materials, ultra-low emission carbon materials, macroreticulate polymer scavengers, molecular sieves, and mixtures thereof.

4. The method of claim 1 wherein the purifying material is fixed within the vessel.

5. The method of claim 1 wherein the ionic liquid is selected from the group consisting of mono-substituted imidazolium salts, di-substituted imidazolium salts, tri-substituted imidazolium salts, pyridinium salts, pyrrolidinium salts, phosphonium salts, ammonium salts, tetralkylammonium salts, guanidinium salts, uronium salts, and mixtures thereof.

6. The method of claim 1 wherein the ionic liquid is selected from the group consisting of pyridinium salts, pyrrolidinium salts, phosphonium salts, ammonium salts, tetralkylammonium salts, guanidinium salts, uronium salts, and mixtures thereof.

7. The method of claim 1 wherein the unstable fluid is selected from the group consisting of digermane, borane, diborane, disilane, fluorine, halogenated oxy-hydrocarbons, hydrogen selenide, stibene, nitric oxide, organometallics, and mixtures thereof.

8. The method of claim 1 wherein the impurity is selected from the group consisting of water, $CO_2$, oxygen, CO, NO, $NO_2$, $N_2O_4$, $SO_2$, $SO_3$, SO, $S_2O_2$, $SO_4$, and mixtures thereof.

9. The method of claim 1 wherein the fluid mixture comprises a gas.

10. The method of claim 1 wherein the fluid mixture comprises a liquid.

11. The method of claim 1 wherein there is substantially no decomposition of the unstable fluid a period of time of at least about 1 hour.

12. The method of claim 11 wherein the period of time is at least about 24 hours.

13. The method of claim 11 wherein the period of time is at least about 7 days.

14. The method of claim 1 wherein contacting the fluid mixture with the ionic liquid comprises spraying the ionic liquid through the fluid mixture.

15. The method of claim 1 wherein the step of contacting the fluid mixture with the ionic liquid comprises mechanically agitating the fluid mixture and the ionic liquid.

16. The method of claim 1 further wherein the ionic liquid takes up the fluid mixture, further comprising releasing the fluid mixture from the ionic liquid.

17. The method of claim 1 wherein there is substantially no chemical change in the ionic liquid.

* * * * *